US012344032B2

(12) United States Patent
Reiling et al.

(10) Patent No.: US 12,344,032 B2
(45) Date of Patent: Jul. 1, 2025

(54) METHOD FOR PRODUCING A MOTOR VEHICLE RIM MADE OF AN ALUMINUM ALLOY FOR A WHEEL OF A MOTOR VEHICLE AND CORRESPONDING MOTOR VEHICLE RIM

(71) Applicant: AUDI AG, Ingolstadt (DE)

(72) Inventors: Jaan Mattes Reiling, Sassenberg (DE); Jan Gaugler, Neckarmühlbach (DE); Marc Hummel, Güglingen (DE)

(73) Assignee: AUDI AG, Ingolstadt (DE)

( * ) Notice: Subject to any disclaimer, the term of this patent is extended or adjusted under 35 U.S.C. 154(b) by 441 days.

(21) Appl. No.: 17/785,218

(22) PCT Filed: Dec. 3, 2020

(86) PCT No.: PCT/EP2020/084423
§ 371 (c)(1),
(2) Date: Jun. 14, 2022

(87) PCT Pub. No.: WO2021/144063
PCT Pub. Date: Jul. 22, 2021

(65) Prior Publication Data
US 2023/0013726 A1   Jan. 19, 2023

(30) Foreign Application Priority Data
Jan. 14, 2020 (DE) .......................... 102020100688.8

(51) Int. Cl.
*B60B 21/02* (2006.01)
*B22D 21/04* (2006.01)
(Continued)

(52) U.S. Cl.
CPC ............ *B60B 21/023* (2013.01); *B22D 21/04* (2013.01); *B60B 21/026* (2013.01);
(Continued)

(58) Field of Classification Search
CPC .... B22D 21/04; B22D 21/007; B22D 15/005; B22D 17/00; C22C 21/04; C22C 21/02;
(Continued)

(56) References Cited

U.S. PATENT DOCUMENTS 5,336,344 A    8/1994  Wei
2009/0314392 A1* 12/2009  Wuest ..................... C22C 21/02
                                                    148/440

FOREIGN PATENT DOCUMENTS

CN    104350165 A  *  2/2015  ........... B22D 21/007
CN    106274279 A  *  1/2017
(Continued)

OTHER PUBLICATIONS

Li Zhenglin; Aluminum alloy automobile hub and preparation method thereof; EPO English Machine Translation; pp. 1-11 (Year: 2017).*
(Continued)

*Primary Examiner* — Bayan Salone
(74) *Attorney, Agent, or Firm* — Maier & Maier, PLLC (57) ABSTRACT

A method for producing a motor vehicle rim made of an aluminum alloy for a wheel of a motor vehicle, the motor vehicle rim having a rim base limited on opposite sides by an outer horn and an inner horn, a hub with a central recess and a hole circle, and a rim center connecting the rim base and the hub to one another. The motor vehicle rim is produced in one piece and continuously in a casting mold by die casting of a casting material, the casting material being the aluminum alloy.

15 Claims, 1 Drawing Sheet

(51) Int. Cl.
*C22C 21/04* (2006.01)
*C22F 1/04* (2006.01)
*C22F 1/043* (2006.01)

(52) U.S. Cl.
CPC ............ *B60B 21/028* (2013.01); *C22C 21/04* (2013.01); *C22F 1/043* (2013.01); *B60B 2360/104* (2013.01); *B60B 2900/113* (2013.01)

(58) Field of Classification Search
CPC ..... C22F 1/043; B60B 21/023; B60B 21/026; B60B 21/028; B60B 2360/104; B60B 2900/113; B60B 2900/112; B60Y 2200/10; Y02T 10/86
See application file for complete search history.

(56) References Cited

FOREIGN PATENT DOCUMENTS

| | | | | |
|---|---|---|---|---|
| CN | 107675045 A | * | 2/2018 | |
| CN | 106274279 B | | 7/2018 | |
| CN | 109295351 A | | 2/2019 | |
| DE | 69601183 T2 | | 7/1999 | |
| DE | 29522065 U1 | | 10/1999 | |
| DE | 60011517 T2 | * | 7/2005 | ............ C22C 21/02 |
| DE | 102008046803 A1 | * | 3/2010 | ............ C22C 21/06 |
| DE | 102008056511 A1 | * | 5/2010 | ............ C22F 1/043 |
| DE | 102008046803 B4 | | 1/2011 | |
| DE | 102008056511 B4 | | 1/2011 | |
| DE | 102015007929 A1 | | 12/2016 | |
| EP | 0301472 B1 | | 4/1991 | |
| EP | 0687742 B1 | | 9/1997 | |
| EP | 0933441 A1 | | 8/1999 | |
| EP | 3176275 A1 | | 6/2017 | |
| EP | 3176275 B1 | * | 10/2018 | ........... B22D 21/007 |
| JP | 2010031360 A | * | 2/2010 | ............ C22C 21/02 |
| KR | 100748757 B1 | | 8/2007 | |
| WO | 2005078147 A1 | | 8/2005 | |
| WO | WO-2015016320 A1 | * | 2/2015 | .............. B22C 9/28 |
| WO | 2017165962 A1 | | 10/2017 | |

OTHER PUBLICATIONS

Hummel et al.; Aluminium-Silicon Die Casting Alloy Method for Producing a Die Casting Component Made of the Alloy, and a Body Component With a Die Casting Component; EPO English Machine Translation; pp. 1-15 (Year: 2017).*
Office Action issued on Jun. 30, 2023, in corresponding Chinese Application No. 202080093148.8, 18 pages.
Wikipedia., "car rim"; Accessed on Aug. 2, 2022; (14 pp., including machine-generated English translation).
German Examination Report issued on Sep. 15, 2020, in connection with corresponding German Application No. 102020100688.8 (20 pp., including machine-generated English translation).
International Preliminary Report on Patentability with English translation issued on Jul. 19, 2022, in corresponding International Application No. PCT/EP2020/084423; 15 pages.
International Search Report with English translation issued on Mar. 11, 2021, in corresponding International Application No. PCT/EP2020/084423; 5 pages.
Association of the Aluminum Industry e.V., "Heat treatment of aluminum alloys", ISBN 978-3-937171-19-7, Sep. 30, 2007; 56 pages with english translation.
Office Action issued on Feb. 13, 2023, in corresponding Chinese Application No. 202080093148.8, 22 pages.

* cited by examiner

METHOD FOR PRODUCING A MOTOR VEHICLE RIM MADE OF AN ALUMINUM ALLOY FOR A WHEEL OF A MOTOR VEHICLE AND CORRESPONDING MOTOR VEHICLE RIM

FIELD

The invention relates to a method for producing a motor vehicle rim made of an aluminum alloy for a wheel of a motor vehicle, the motor vehicle rim having a rim base delimited on opposite sides by an outer horn and an inner horn, a hub with a central recess and a hole circle, and a rim center connecting the rim base and the hub to one another and which acts eccentrically on the rim base, in particular in a longitudinal section. The invention also relates to a motor vehicle rim.

BACKGROUND

The publication EP 0301 472 B1, for example, is known from the prior art. This document describes a manufacturing process for cast light metal wheels for passenger cars, using a near-eutectic, refined AlSi alloy that—in addition to Al—has a weight proportion of 9.5% to 12.5% silicon and alloy components such as a maximum of 0.2% iron, a maximum of 0.05% manganese, a maximum of 0.1% titanium, a maximum of 0.03% copper, a maximum of 0.05% zinc and an individual maximum for each other impurity of 0.05% and of 0.15% in total of other impurities, and wherein, after solidification, the wheels are removed from the mold and cooled. It is provided that the alloy contains at least 0.05 to a maximum of 0.15% by weight of magnesium and that the wheels are quenched in water, from a temperature—measured on their surface—of at least 380° C. in inner regions or regions with mass concentrations, such as hubs and wheel discs, immediately upon removal from the mold.

Furthermore, DE 69601 183 T2 shows an aluminum die-cast alloy for a wheel disc, comprising Si: 0.6 to 1.0% by weight, Mg: 0.8 to 1.2% by weight, Cu: 0.1 to 0.5% by weight, Zn: 0.4 to 1.2% by weight, Mn: 0.4 to 1.2% by weight, Ti: 0.01 to 0.20% by weight, B: 0.002 to 0.04% by weight and the remainder Al and unavoidable impurities. In addition, EP 3 176 275 A1 describes an aluminum-silicon die-cast alloy, a method of making a die-cast component from the alloy, and a body component having a die-cast component.

SUMMARY

It is an object of the invention to propose a method for producing a motor vehicle rim from an aluminum alloy for a wheel of a motor vehicle, which has advantages over known methods of this type, in particular a particularly fast and cost-effective production of the motor vehicle rim with particularly delicate structures.

This is achieved by a method for manufacturing a motor vehicle rim with. It is envisaged that the motor vehicle rim will be produced in one piece and continuously in a casting mold by die casting a casting material, wherein the aluminum alloy containing 6.5% by weight to 12.0% by weight of silicon is used as the casting material, with a maximum of 0.80% by weight, in particular 0.20% by weight to 0.80% by weight or 0.30% by weight to 0.80% by weight, of manganese, 0.25% by weight to 0.60% by weight, in particular 0.25% by weight to 0.50% by weight, of magnesium, 0.08% by weight to 0.50% by weight, in particular 0.08% by weight to 0.35% by weight, of zinc, a maximum of 0.30% by weight, in particular 0.05% by weight to 0.30% by weight, of zirconium, a maximum of 0.025% by weight, in particular 0.006% by weight to 0.025% by weight, of strontium, a maximum of 0.5% by weight of unavoidable impurities and the remainder aluminum and the motor vehicle rim is heat-treated after die-casting, the heat treatment being a single-stage or multi-stage solution annealing, a subsequent quenching and a subsequent single-stage or multi-stage artificial aging.

The motor vehicle rim is usually part of the wheel of the motor vehicle, with several wheels being arranged on the motor vehicle, each of which has such a motor vehicle rim. The motor vehicle is in the form of a motor car and has more than two wheels, in particular exactly four wheels. The motor vehicle rim is explicitly provided and designed for use in such a motor vehicle designed as a motor car. The motor vehicle rim is therefore not available as a generic motor vehicle rim, but is intended for use on the motor vehicle and is designed accordingly.

The main components of the motor vehicle rim are the rim base, the rim center and the hub. The rim base and the hub are connected to one another via the rim center, wherein at least the rim base, the rim center and the hub are formed in one piece and of the same material. The rim base, the rim center and the hub are formed simultaneously with one another, namely during a single assembly step. So it is not intended to manufacture the rim base, the rim center and the hub separately from one another and subsequently attach them to one another. Rather, the production takes place simultaneously, namely by die casting of the casting material in the mold.

The motor vehicle rim has a longitudinal central axis which, in particular, corresponds to a longitudinal central axis of the hub and preferably coincides or at least almost coincides with a subsequent axis of rotation of the wheel. Seen in the axial direction with respect to this longitudinal central axis, the rim base is delimited on opposite sides by the outer horn and the inner horn. The outer horn and the inner horn are on opposite sides of the rim base and enclose a tire receiving region of the motor vehicle rim between them as seen in a longitudinal section with respect to the longitudinal central axis. The tire receiving region is used to accommodate a tire, which, together with the motor vehicle rim, forms the wheel. Tire receiving region is delimited radially inward by the rim base and axially on opposite sides by the outer horn and the inner horn.

Particularly preferably, the entire motor vehicle rim is delimited in the axial direction or in longitudinal section in a first direction by the outer horn and in a second direction by the inner horn, so that the outer horn and the inner horn define a total extension of the motor vehicle rim in the axial direction, corresponding to a width the motor vehicle rim. When the wheel is mounted on the motor vehicle, the wheel is rotatably mounted on a wheel support via a wheel bearing. After the wheel has been mounted on the motor vehicle, the outer horn is on a side of the motor vehicle rim facing away from the wheel support and the inner horn is on a side of the motor vehicle rim facing the wheel support.

The outer horn and the inner horn are in the form of a radial projection starting from the rim base and extending radially outwards from the rim base, again in relation to the longitudinal central axis of the motor vehicle rim. Of course, the outer horn and the inner horn are also formed in one piece and of the same material with the rest of the motor vehicle rim, in particular the rim base, the rim center and the hub. They are insofar formed simultaneously therewith during die casting.

The hub has the central recess and the hole circle. The central recess is a centered recess for receiving a wheel hub of the motor vehicle, to which the wheel is attached during mounting on the motor vehicle. The wheel hub is rotatably mounted on the wheel support via the wheel bearing. The hole circle consists of several holes arranged along an imaginary circle, each of which is used to hold a fastener, which is used to fasten the motor vehicle rim to the wheel hub. The fastening means is, for example, in the form of a screw, a bolt or the like.

The rim base and the hub are connected to each other via the rim center. The rim center is therefore located between the rim base and the hub in the radial direction with respect to the longitudinal central axis. Seen in the radial direction, it extends from the hub to the rim base. For example, the rim center has a plurality of spokes which are arranged or formed at a distance from one another in the circumferential direction. However, the rim center can also be designed continuously in the circumferential direction, in particular completely.

The rim center engages in the axial direction or viewed in longitudinal section, for example, eccentrically on the rim base. This means that it merges into the rim base in the axial direction away from a center point of the latter. The rim center preferably acts at a distance from the center point of the rim base in the axial direction, which is at least 10%, at least 20%, at least 30%, at least 40% or more in relation to the total extent of the rim base in the axial direction. For example, viewed in the axial direction, the rim center merges with the rim base at the end thereof. In this case, the rim center, viewed in longitudinal section, opens into the rim base overlapping the outer horn or the inner horn, preferably the former. Due to the rim center acting eccentrically on the rim base, not only a force acts on the rim center after the wheel has been mounted on the motor vehicle in the radial direction, but also a bending moment in the axial direction or in an imaginary plane containing the longitudinal central axis of the motor vehicle rim. Because of this, it was previously necessary to make the rim center correspondingly massive using a lot of material. Alternatively, however, the rim center can also act centrally on the rim base and/or the hub.

Viewed in longitudinal section, the rim base preferably has a greater extent in the axial direction than the rim center and the hub. In particular, the axial extent of the rim base is greater than the axial extent of the hub, which in turn is greater than the axial extent of the rim center. For example, the axial extension of the hub based on the axial extent of the rim base is 50%, 40%, 30%, 25% or 20% at most. The axial extent of the rim center is, for example, at most 25%, at most 20%, at most 15%, at most 10% or at most 5%, based on the axial extent of the rim base. The dimensions mentioned create a receptacle for the wheel hub and/or a brake disc fastened to the wheel, surrounded by the rim base, with the wheel hub and/or the brake disc being present in this receptacle after the wheel has been mounted on the motor vehicle. This is the case in particular when the rim center engages the rim base off-center.

The motor vehicle rim consists continuously and of the same material as the casting material, namely aluminum or—preferably—aluminum alloy. This is processed by die-casting. In die casting, the casting mold is used, by means of which the motor vehicle rim and thus at least the rim base together with the outer horn and the inner horn, the rim center and the hub are formed. The central recess, which incidentally can also be referred to as the wheel hub mount, is preferably at least partially formed during die casting.

The die-casting can take place, for example, at atmospheric pressure or—preferably—through vacuum die-casting. Vacuum die casting is characterized in that the casting mold is at least partially evacuated before and/or during the introduction of the casting material into the casting mold. This means that the casting mold is subjected to a negative pressure before and/or during the introduction of the casting material. The negative pressure is to be understood here as meaning a pressure which is lower than an introduction pressure at which the casting material is introduced into the casting mold and/or an ambient pressure in an external environment of the casting mold. For example, the negative pressure based on the external pressure is at most 50%, at most 25%, at most 10% or at most 5%. For example, the residual pressure is between 50 mbar and 200 mbar. The residual pressure is the absolute pressure in the casting mold.

The casting mold is evacuated, for example, by means of a vacuum source, which is flow-connected to the casting mold for this purpose. In particular, the casting mold is evacuated before the casting material is introduced. For example, the casting material is introduced when, in particular only when, a certain negative pressure or residual pressure is reached in the casting mold. It can additionally or alternatively be provided to evacuate the casting mold during the introduction of the casting material, i.e. to maintain the flow connection between the vacuum source and the casting mold during the introduction of the casting material into the casting mold and to continue to operate the vacuum source for evacuating the casting mold. As a result, the motor vehicle rims can be produced with particularly delicate structures.

For example, provision is made for the casting mold to first be sealed by means of at least one seal, for example by means of a sealing cord, in particular a silicone sealing cord. The casting material is then metered into a casting chamber that is fluidically connected to the casting mold. For this purpose, the casting chamber is fluidically connected at least at times to a crucible in which the molten casting material is stored. Then the casting mold is subjected to the negative pressure and the casting material in the casting chamber is forced into the casting mold, in particular by means of a pressurized piston. The flow connection between the casting chamber and the crucible preferably is present at the same time, in particular continues to exist. This means that the casting chamber is also evacuated while the casting material is being introduced.

The aluminum alloy is used as the casting material, which consists of 6.5% by weight to 12.0% by weight of silicon (Si), a maximum of 0.80% by weight, in particular 0.30% by weight to 0.80% by weight of manganese (Mn), 0.25% by weight to 0.60% by weight, in particular 0.25% by weight to 0.50% by weight, of magnesium (Mg), 0.08% by weight to 0.50% by weight, in particular 0.08% by weight to 0.35% by weight, of zinc (Zn), a maximum of 0.30% by weight, in particular 0.05% by weight to 0.30% by weight, of zirconium (Zr), a maximum of 0.25% by weight, in particular 0.006% by weight to 0.025% by weight, of strontium (Sr), a maximum of 0.5% by weight, of unavoidable impurities, and the remainder being aluminum (Al). The aluminum alloy particularly preferably contains only the components mentioned, i.e. silicon, (optional) manganese, magnesium, zinc, (optional) zirconium, (optional) strontium, aluminum and—optionally—the unavoidable impurities with a maximum proportion of 0.5% by weight or less. The aluminum alloy particularly preferably contains chromium (Cr), namely a maximum of 0.3% by weight. The unavoidable impurities particularly preferably have a proportion of at most 0.25% by weight, at most 0.1% by weight or at most 0.05% by weight. Impurities are at least one element of the periodic table that is present in the alloy without being intentionally added. Of course, the impurities can also contain several of these elements.

Such an aluminum alloy is normally particularly well suited for body components of the motor vehicle because it has good fluidity and therefore very thin-walled structures can be cast. However, such is or are not required or desired for motor vehicle rims, in particular because they are usually produced by chill casting. Surprisingly, however, it has now been found that the aluminum alloy is also particularly suitable for producing the motor vehicle rim, this being the case in particular and preferably only when the motor vehicle rim is produced by die casting.

Adequate castability of the aluminum alloy is ensured by a silicon content of at least 6.5% by weight. In addition, solidification shrinkage is avoided. By limiting the proportion of silicon to a maximum of 12.0% by weight, the occurrence of primary silicon phases is avoided. The manganese content of at most 0.80% by weight improves the demoldability from the casting mold, in particular with a low iron content of at most 0.3% by weight. The magnesium content of at least 0.25% by weight leads to the formation of hardening $Mg_2Si$ phases; the upper limit of a maximum of 0.60% by weight of magnesium prevents the motor vehicle rim from becoming too brittle.

The zinc content of the aluminum alloy serves to increase strength through solid solution hardening. Since a high proportion of zinc increases the tendency of the finished motor vehicle rim to corrode, the proportion of zinc is limited to a maximum of 0.5% by weight, in particular to a maximum of 0.3% by weight. The optional addition of zirconium serves to improve the mechanical properties of the aluminum alloy. It has been shown that the optimal proportion of zirconium is at most 0.30% by weight, in particular 0.05% by weight to 0.30% by weight. The optional strontium content of at most 0.025% by weight, in particular from 0.006% by weight to 0.025% by weight, serves to refine the aluminum alloy.

After die-casting, the motor vehicle rim is heat-treated in order to achieve particularly good mechanical properties in the motor vehicle rim. The heat treatment here comprises solution annealing, quenching following solution annealing, and artificial aging following quenching. The solution annealing can either be carried out in one or more stages, as can artificial aging. Under a single-stage solution annealing or artificial aging, a thermal treatment is understood in which the motor vehicle rim is heated from an initial temperature to a specific heat treatment temperature and is held at this temperature for a specific period of time. In the following, the motor vehicle rim is cooled from the heat treatment temperature in the direction of the starting temperature, in particular down to the starting temperature, and the solution annealing or artificial aging is finished. Single-stage solution annealing and single-stage artificial aging are preferred over the multi-stage procedure because they are associated with low manufacturing costs for the motor vehicle rim.

Multi-stage solution annealing or artificial aging, on the other hand, refers to a heat treatment in which the motor vehicle rim starting from the starting temperature, is heated to a first heat treatment temperature and held at this for a specific first period of time. The motor vehicle rim is then heated or cooled to a second heat treatment temperature and held at it for a second period of time. The same procedure can be used for further heat treatment temperatures, so that, in general terms, the motor vehicle rim is brought to several heat treatment temperatures during the multi-stage solution annealing or the multi-stage artificial aging and is held at these for a specific period of time before the motor vehicle rim is cooled back down towards the starting temperature, especially up to the starting temperature. The multiple heat treatment temperatures differ from one another and are each higher than the starting temperature.

As a rule, these multi-stage processes have advantages in terms of the mechanical properties that can be achieved, especially the achievable strengths, the 0.2% yield point and the tensile strength. Furthermore, the multi-stage solution annealing has advantages in terms of the dimensional accuracy that can be achieved, since in this case a lower thermal load is usually applied to the parts than with a comparable single-stage heat treatment.

It can—optionally—be provided that the motor vehicle rim has a small wall thickness of at most 15 mm, at least in some regions, and/or has a curvature with a small radius of curvature of at most 4 mm, and/or a curvature in the axial direction and radial direction and/or or has a demolding surface running in the axial direction and in a tangential direction with respect to a longitudinal central axis of the motor vehicle rim, which lies completely in an imaginary plane, the plane forming an angle with the longitudinal central axis of more than 0° and at most 4°.

The motor vehicle rim produced by die casting is characterized by a particularly small wall thickness and/or a curvature with a particularly small radius of curvature and/or by the presence of the demolding surface. The wall thickness is to be understood as meaning the thickness of the wall of the motor vehicle rim at least one point. The small wall thickness can therefore be present, for example, on the rim base, the outer horn, the inner horn, the rim center and/or the hub. The low wall thickness at the rim center is particularly preferred. The small wall thickness is very particularly preferably the greatest wall thickness, for example the greatest wall thickness of the outer horn, the greatest wall thickness of the inner horn and/or the greatest wall thickness of the rim center. Of course, it can also be the greatest wall thickness of the rim base and/or the hub.

The small wall thickness is at most 15 mm, at most 10 mm, at most 7.5 mm or at most 5 mm, but is preferably smaller Thus it is, for example, at most 4 mm, at most 3 mm, at most 2 mm or at most 1.5 mm Conversely, the small wall thickness is particularly preferably at least 1.5 mm or at least 2 mm. In other words, the small wall thickness is, for example, at least 1.5 mm and at most 5 mm, at least 1.5 mm and at most 4 mm, at least 1.5 mm and at most 3 mm, at least 1.5 mm and at most 2 mm or about or exactly 1.5 mm. However, it can also be at least 2 mm and at most 5 mm, at least 2 mm and at most 4 mm, at least 2 mm and at most 3 mm or exactly 2 mm.

In addition or as an alternative to the small wall thickness, there is the curvature with the small radius of curvature. The curvature is a curvature of an outer surface or an outer peripheral surface of the motor vehicle rim. The outer surface delimits a wall of the motor vehicle rim to the outside. The curvature can be present at any point on the motor vehicle rim, for example on the rim base, the outer horn, the inner horn, the rim center and/or the hub. The curvature is in particular a transitional curvature between two surfaces which—seen in section—are angled to one another and are present, for example, as flat surfaces.

The curvature preferably extends over an angle of at least 30°, at least 45°, at least 60° or at least 90°. The curvature has the small radius of curvature, which is at most 4 mm, but is preferably smaller. For example, the small radius of curvature corresponds to a radius of curvature of at most 3 mm, at most 2 mm, at most 1.5 mm or at most 1 mm Radiuses of curvature of at most 2 mm or less are preferred. Conversely, the radius of curvature can additionally be at least 0.25 mm, at least 0.5 mm or at least 0.75 mm.

In addition or as an alternative to the small wall thickness and/or the curvature with the small radius of curvature, the motor vehicle rim can have a demolding surface.

The demolding surface is a flat surface that lies directly against the mold during die-casting and along which, after die-casting, the demolding of the motor vehicle rim from the mold takes place. The demolding surface has an extension at least in the axial direction and in the radial direction and/or—additionally or alternatively—in the axial direction and in the tangential direction, in each case with respect to the longitudinal central axis of the motor vehicle rim. In any case, the demolding surface therefore extends in two mutually perpendicular directions and in this respect lies completely in the imaginary plane.

The motor vehicle rim is demolded in the same direction. For example, part of the mold is displaced after the die-casting in the direction of the longitudinal central axis, i.e. in the axial direction, to open the mold and to remove the motor vehicle rim from the mold. This means that a casting mold surface of the casting mold that rests against and forms the demolding surface during die casting is displaced along the longitudinal central axis after die casting. In a conventional method for manufacturing a motor vehicle rim, a demolding angle, i.e. an angle between the demolding surface and the longitudinal central axis, must be at least 5° in order to ensure proper demolding.

Due to the one-piece and continuous formation of the motor vehicle rim by die-casting aluminum or the aluminum alloy, however, a significantly smaller angle can be realized. The angle between the demolding surface or between the plane completely accommodating the demolding surface and the longitudinal central axis is between infinitesimally more than 0° and 4°, each including these values. Provision can therefore be made for the demolding surface to run almost parallel to the longitudinal central axis, so that the casting mold surface and the demolding surface are displaced almost parallel during demolding. The angle of 0° means that the plane and the longitudinal central axis are coincident or run parallel to one another. The angle is, for example, at least 0.5°, at least 1° or at least 1.5°. However, a maximum angle of 4° is provided. For example, the angle is at most 3°, at most 2.0°, at most 1.5°, at most 1.0° or at most 0.5°. The smaller angles of at most 2.0° and less are preferred in this case.

The procedure described in the production of the motor vehicle rim allows for a simple, quick and inexpensive design of the motor vehicle rim, which at the same time has an extremely delicate structure. The rapid production is achieved in particular by die casting, in which the mold is filled much more quickly than in the case of permanent mold casting or low-pressure casting, which is normally used to manufacture motor vehicle rims. All in all, the cycle time in the production of the motor vehicle rim can be significantly increased by die casting, so that a larger number of motor vehicle rims can be produced in the same period of time. The solidification time is also significantly shorter for die casting than for permanent mold casting.

A development of the invention provides that the rim center is formed with a plurality of spokes spaced apart from one another in the circumferential direction with respect to the longitudinal central axis of the motor vehicle rim. Such a design of the rim center is used in particular to reduce the weight of the rim, but also to achieve better damping. In this respect, the rim center is not solid and designed to be continuous in the circumferential direction, but is composed of several spokes that are arranged at a distance from one another in the circumferential direction. Each of the multiple spokes preferably extends from the hub in the radial direction to the rim base, i.e. it connects the hub and the rim base to one another. For example, at least three spokes, at least four spokes, at least five spokes or at least six spokes are provided. For example, at least 10, at least 14 or at least 18 spokes are implemented. Preferably there are at most 30 spokes or at most 15 spokes. For example, each of the spokes extends in the circumferential direction over at most 30° or less, preferably at most 15° or at most 10°.

Provision can be made for the spokes to have a constant extent in the circumferential direction, that is to say starting from the rim base up to the hub. However, it is also possible for at least one of the spokes or several or each of the spokes to branch out, so that the respective spoke is divided into a number of partial spokes. For example, the spoke initially extends outwards in the radial direction, starting from the hub, and is divided at a division point into a plurality of partial spokes, which extend from one another, in particular in the circumferential direction. After the dividing point, the partial spokes thus run at a distance from one another up to the rim base and engage this at a distance from one another. Provision can be made for a central longitudinal axis of at least one of the spokes, in particular the central longitudinal axes of several or all of the spokes, to intersect the central longitudinal axis of the motor vehicle rim or even be perpendicular to it. This achieves a particularly optimal introduction of force from the rim center or from the spokes into the hub.

A further development of the invention provides that the aluminum alloy contains at least 0.35% by weight and at most 0.50% by weight magnesium, in particular at least 0.38% by weight and at most 0.45% by weight magnesium. Surprisingly, it has been shown that the mentioned magnesium components in the aluminum alloy also lead to a particularly durable motor vehicle rim during the production of the motor vehicle rim, in particular due to the hardening $Mg_2Si$ phases.

A further development of the invention provides that the aluminum alloy contains at most 0.05% by weight of copper (Cu), at most 0.002% by weight of phosphorus (P), at most 0.002% by weight of calcium (Ca), at most 0.002% by weight of sodium (Na) and/or at most 0.30% by weight of iron (Fe) impurities. It has already been explained above that the aluminum alloy contains a maximum total of 0.5% by weight of impurities. These impurities consist in particular or exclusively of copper, phosphorus, calcium, sodium and/or iron, the impurities containing or at least being able to contain, for example, only exactly one of the elements mentioned, several of the elements mentioned or all of the elements mentioned. With the stated maximum proportions of the individual elements mentioned, a particularly good durability of the motor vehicle rim is achieved. Of course, the impurities can have at least one other element as an alternative or in addition to at least one of the elements mentioned, in particular while maintaining the maximum total amount of at most 0.5% by weight of the impurities.

A further development of the invention provides that the aluminum alloy additionally contains a maximum of 0.2% by weight of vanadium (V), a maximum of 0.2% by weight of molybdenum (Mo), a maximum of 0.3% by weight of tin (Sn), a maximum of 0.3% by weight of cobalt (Co) and/or a maximum of 0.2% by weight of titanium (Ti). In addition to the elements already mentioned, the aluminum alloy contains at least one of the elements mentioned here, several of the elements mentioned or all of the elements mentioned. In other words, exactly one, several or all of the following elements are added to the aluminum alloy: vanadium, molybdenum, tin, cobalt and titanium. However, of course, the aluminum alloy can also be free of these elements.

The strength of the motor vehicle rim can be further improved by adding tin and/or cobalt. The addition of tin leads to an increase in the number of vacancies after quenching, which results in accelerated precipitation kinetics. However, the content of tin and cobalt is limited to a maximum of 0.3% by weight each, because otherwise, in the case of cobalt, brittle intermetallic phases and, in the case of tin, low-melting structural components occur or at least can occur. A particularly good grain refinement of the aluminum alloy can be achieved with the addition of vanadium and/or molybdenum and/or titanium, individually or in combination with one another, each with a maximum content of 0.2% by weight.

If it is stated that the elements mentioned are added to the aluminum alloy in the respective stated proportion, this means that the respective element is actually added, i.e. the proportion of the element is greater than 0.0% by weight. For example, the aluminum alloy additionally contains the following elements: 0.05% by weight to 0.2% by weight of vanadium and/or 0.05% by weight to 0.2% by weight of molybdenum and/or 0.1% by weight % to 0.3% by weight of tin and/or 0.1% to 0.3% by weight of cobalt and/or 0.05% to 0.2% by weight of titanium. This achieves the particularly advantageous properties of the motor vehicle rim.

A development of the invention provides that the single-stage solution annealing takes place at a temperature of at least 510° C. and at most 540° C., in particular at most 535° C., over a period of at least 25 minutes, in particular 35 minutes, to at most 180 minutes. Single-stage solution annealing means solution annealing followed by quenching without further solution annealing. Quenching preferably follows immediately after the single-stage solution annealing, in particular without the motor vehicle rim being further heated starting from the temperature used for the single-stage solution annealing.

With the single-stage solution annealing, which can be carried out with very little effort, particularly advantageous strength values of the motor vehicle rim are achieved. The temperature in the single-stage solution annealing is particularly preferably at least 520° C., at least 525° C. or at least 530° C. and in each case at most 540° C. or at most 535° C. in each case. The single-stage solution annealing is more preferably carried out over a period of at least 45 minutes, at least 60 minutes, at least 90 minutes or at least 120 minutes and in each case at most 180 minutes. Due to the long period of time, a particularly uniform microstructure of the motor vehicle rim is achieved.

A further development of the invention provides that the multi-stage solution annealing comprises a first solution annealing and a second solution annealing, with the first solution annealing being carried out at a first temperature over a first period of time and the second solution annealing being carried out at a second temperature over a second period of time, wherein the second temperature is higher than the first temperature and/or the second time period is shorter than the first time period. The second solution annealing preferably follows immediately after the first solution annealing. At the beginning of the second solution annealing, the temperature of the motor vehicle rim is increased from the first temperature, namely up to the second temperature.

In particular, there is no quenching between the first solution annealing and the second solution annealing, i.e. the temperature of the motor vehicle rim during the multi-stage solution annealing always corresponds at least to the lower temperature between the first temperature and the second temperature, i.e. it is always greater than or equal to these. A procedure for multi-stage solution annealing in which the second temperature is higher than the first temperature is particularly preferred. Additionally or alternatively, the second period of time is shorter than the first period of time. In this case, it is provided in particular to quench the motor vehicle rim immediately after the second solution annealing, i.e. after the second period of time has elapsed.

For example, it is provided that the first solution annealing takes place at a temperature of at least 440° C. and at most 480° C. and the second solution annealing at a temperature of at least 500° C. and at most 540° C. Additionally or alternatively, the first solution annealing is carried out over a period of at least 30 minutes to a maximum of 150 minutes, in particular up to a maximum of 90 minutes, and the second solution annealing is carried out over a period of at least 20 minutes to a maximum of 90 minutes. In other words, the first temperature of the first solution annealing is 440° C. to 480° C. and the second temperature of the second solution annealing is 500° C. to 540° C. Additionally or alternatively, the first duration of the first solution annealing is 30 min to 150 min, in particular 30 min to 90 min, and the second duration of the second solution annealing is 20 min to 90 min. The first temperature is particularly preferably from 450° C. to 470° C. and the second temperature is from 520° C. to 530° C. Additionally or alternatively, the first period is 45 minutes to 75 minutes and the second period is 35 minutes to 45 minutes. Good strength of the motor vehicle rim is achieved with the stated values.

A development of the invention provides that the quenching takes place with a temperature gradient of at least 20 K/s. In this case, the quenching preferably takes place by means of a fluid, in particular by means of water. The fluid is sprayed onto the motor vehicle rim for quenching. Alternatively, the motor vehicle rim is at least partially or even completely immersed in the fluid. Alternatively, quenching can take place using a fluidized medium. The temperature gradient is particularly preferably at least 40 K/s, at least 70 K/s or at least 100 K/s.

For example, the temperature gradient is limited to a maximum of 150 K/s, a maximum of 200 K/s or a maximum of 300 K/s, so that the total temperature gradient is 20 K/s to 200 K/s. It can also be provided that the temperature gradient during quenching by means of the fluid or the fluidized medium is always at most 60 K/s, at most 40 K/s or at most 20 K/s. For this purpose, for example, the temperature of the fluid or the medium is adjusted accordingly. The described procedure leads to a motor vehicle rim with particularly good mechanical properties.

A further development of the invention provides that the single-stage artificial aging takes place at a temperature of at least 135° C., in particular at least 150° C. to 230° C., in particular up to 220° C., over a period of at least 90 minutes, in particular from at least 120 minutes to a maximum of 420 minutes. The temperature of the motor vehicle rim is preferably reduced immediately after the single-stage artificial aging in the direction of an ambient temperature, in particular down to the ambient temperature. The temperature of the single-stage artificial aging is preferably at least 150° C., at least 175° C. or at least 200° C., and in each case at most 220° C. It is carried out over a period of at least 120 minutes, at least 180 minutes, at least 240 minutes, at least 300 minutes or at least 360 minutes, but in each case over a maximum of 420 minutes. As a result, particularly good mechanical properties of the motor vehicle rim are achieved.

A development of the invention provides that the multi-stage artificial aging comprises a first artificial aging and a second artificial aging, with the first artificial aging taking place at a first temperature over a first period of time and the second artificial aging at a second temperature over a second period of time, wherein the second temperature is higher than the first temperature and/or the second period of time is shorter, equal to or longer than the first period of time. With regard to temperatures and durations, the same applies to multi-stage artificial aging as to multi-stage solution annealing, so that the corresponding explanations are referred to.

The second artificial aging preferably follows immediately after the first artificial aging, so that at the beginning of the second artificial aging the temperature of the motor vehicle rim is adjusted directly from the first temperature to the second temperature Immediately after the second artificial aging, the temperature of the rim is preferably decreased towards the ambient temperature, especially up to the ambient temperature. Particularly advantageous properties of the motor rim are achieved if the second temperature is selected to be higher than the first temperature. Additionally or alternatively, the second period of time can be shorter or longer than the first period of time or can be of the same length.

For example, the first artificial aging takes place at a temperature of at least 100° C. and at most 170° C. over a period of at least 60 minutes and at most 200 minutes and the second artificial aging at a temperature of at least 170° C. and at most 230° C. over a period of time he from at least 60 min to a maximum of 400 min. In other words, this means that the first temperature is 100° C. to 180° C. and the second temperature is 120° C. to 200° C. Additionally or alternatively, the first period is 45 minutes to 300 minutes, in particular 60 minutes to 200 minutes, and the second period is 60 minutes to 400 minutes. Particularly advantageous properties of the motor vehicle rim are achieved when the first temperature is 140° C. to 170° C. The same applies if a length of 90 minutes to 150 minutes is used for the first period.

The invention also relates to a motor vehicle rim made of an aluminum alloy for a wheel of a motor vehicle, produced in particular in accordance with the statements made within the scope of this description, the motor rim having a rim base delimited on opposite sides by an outer horn and an inner horn, a hub with a central recess and a hole circle as well as a rim center connecting the rim base and the hub to one another and acting eccentrically on the rim base, in particular in longitudinal section.

It is provided that the motor vehicle rim is made in one piece and continuously in a mold by die-casting a casting material, wherein as a casting material the aluminum alloy with the components 6.5% by weight to 12.0% by weight of silicon, a maximum of 0.80% by weight, in particular 0.30% by weight to 0.80% by weight of manganese, 0.25% by weight to 0.60% by weight, in particular especially 0.25% by weight to 0.50% by weight, of magnesium, 0.08% by weight to 0.50% by weight, in particular 0.08% by weight to 0.35% by weight of zinc, a maximum of 0.30% by weight, in particular 0.05% to 0.30% by weight, of zirconium, a maximum of 0.025% by weight, in particular 0.006% to 0.025% by weight of strontium, a maximum of 0.5% by weight of unavoidable impurities and the remainder aluminum is used, and the vehicle rim is heat treated after die casting, wherein the heat treatment comprises a single-stage or multi-state solution annealing, a subsequent quenching and a subsequent single-stage or multi-stage artificial aging.

The advantages of such a configuration of the motor vehicle rims or of such a procedure in their manufacture have already been pointed out above. Both the motor vehicle rim and the method for producing it can be further developed in accordance with the explanations within the scope of this description, so that reference is made to them in this respect.

BRIEF DESCRIPTION OF THE FIGURE

The invention is explained in more detail below with reference to the exemplary embodiments illustrated in the drawing, without the invention being restricted.

In particular.

Figure 1:
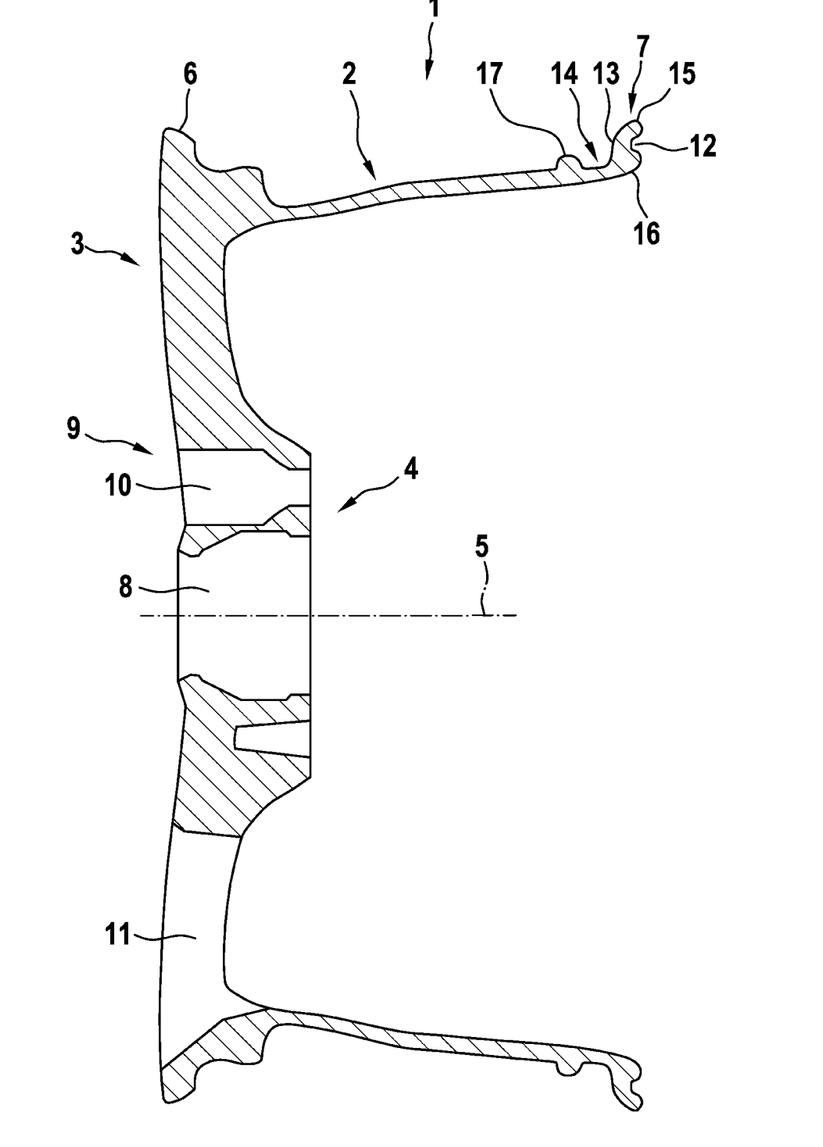
The figure shows a schematic longitudinal section through a motor vehicle rim along a longitudinal central axis of the motor vehicle rim.

FIG. 1 shows a schematic longitudinal section through a motor vehicle rim 1 for a wheel of a motor vehicle. The motor vehicle rim 1 has a rim base 2, a rim center 3 and a hub 4 as essential components. The motor vehicle rim 1 is shown in longitudinal section with respect to a longitudinal central axis 5 of the motor vehicle rim 1. The rim base 2 is delimited in the axial direction by an outer horn 6 on the one hand and by an inner horn 7 on the other hand, which extend outwards from the rim base 2 in the radial direction relative to the longitudinal central axis 5. In addition, it should be noted that the axial extent of the rim base 2 extends to a respective outside end of the outer horn 6 or of the inner horn 7. The axial extent of the rim base 2 thus includes the axial extents of the outer horn 6 and the inner horn 7.

The rim base 2 and the hub 4 are connected to one another via the rim center 3. The rim center 3 therefore engages both the rim base 2 and the hub 4 and extends from the hub 4 to the rim base 2. The hub 4 has a central recess 8 which is located centrally in the hub 4 with respect to the longitudinal central axis 5 and extends completely through it in the axial direction. In addition, the hub 4 has a hole circle 9 with a plurality of holes 10, each of which serves to receive a fastening means by means of which the motor vehicle rim 1 can be fastened or is being fastened to a wheel hub of the motor vehicle.

In the exemplary embodiment shown here, the rim center 3 has a plurality of spokes 11, which are spaced apart from one another in the circumferential direction. Each of the spokes 11 extends from the hub 4 to the rim base 2. In the circumferential direction between the spokes 11 there is an intermediate spoke region which is delimited in the circumferential direction by the spokes 11 in the radial direction inwards by the hub 4 and in the radial direction outwards by the rim base 2. An optional intermediate spoke element can be formed in this intermediate spoke region, which, for example, completely fills the intermediate spoke region. At least the intermediate spoke element has a small wall thickness of at most 5 mm. In particular, in order to realize this, the motor vehicle rim 1 is produced in one piece and continuously in a casting mold by die-casting a casting material. Aluminum or an aluminum alloy is used as the casting material.

In the embodiment shown here, a cavity 12 is formed in the inner horn 7. In addition or as an alternative, such a cavity 12 can be present in the outer horn 6. The cavity 12 extends in the circumferential direction, for example it is continuous in the circumferential direction. This means in particular that the cavity 12 has the same depth throughout in the circumferential direction. The cavity 12 is limited by a rim horn wall 13 in the axial direction with respect to the longitudinal central axis 5, the rim horn wall 13 being arranged in the axial direction between a tire receiving region 14 of the motor vehicle rim 1 and the cavity 12. In the radial outward direction, the cavity 12 is delimited by a rim horn extension 15 and in the radial direction inward by a rim horn extension 16. The cavity 12 is formed in the inner horn 7 in such a way that the rim horn wall 13 has a reduced wall thickness of at most 10 mm immediately after the die-casting.

A hump 17 is also formed on the rim base 2 and is in the form of a radial projection extending outward in the radial direction. The hump 17 delimits the tire receiving region 14 in the axial direction, so that the tire receiving region 14—also viewed in the axial direction—is present between the hump 17 and the inner horn 7.

The described configuration of the motor vehicle rim 1 achieves an extremely delicate appearance and at the same time ensures that the motor vehicle rim 1 can be manufactured quickly and cost-effectively by means of die casting. In addition, excellent strength values are achieved by die-casting the aluminum or aluminum alloy.

REFERENCE LIST 1 motor vehicle rim
2 rim base
3 rim center
4 hub
5 longitudinal central axis
6 outer horn
7 inner horn
8 central recess
9 hole circle
10 bore
11 spoke
12 cavity
13 rim horn wall
14 tire receiving region
15 rim horn extension
16 rim horn extension
17 hump

The invention claimed is:

1. A method for producing a motor vehicle rim made of an aluminum alloy for a wheel of a motor vehicle, comprising: a rim base limited on opposite sides by an outer horn and an inner horn, a hub with a central recess and a hole circle, and a rim center connecting the rim base and the hub to one another, wherein the motor vehicle rim is produced in one piece and continuously in a casting mold by die casting of a casting material, the casting material being the aluminum alloy with constituents 6.5% by weight to 12.0% by weight of silicon, a maximum of 0.80% by weight of manganese, 0.25% by weight to 0.60% by weight of magnesium, 0.08% by weight to 0.50% by weight of zinc, a maximum of 0.30% by weight of zirconium, a maximum of 0.025% by weight of strontium, a maximum of 0.5% by weight of unavoidable impurities, and the remainder being aluminum, and the motor vehicle rim is heat-treated after the die casting, wherein the heat treatment includes a single-stage solution annealing, a subsequent quenching and a subsequent single-stage or multi-stage artificial ageing; wherein the single stage solution annealing takes place over a time period of at most 180 minutes.

2. The method of claim 1, wherein an aluminum alloy with at least 0.35% by weight and at most 0.50% by weight of magnesium is used.

3. The method of claim 1, wherein an aluminum alloy with a maximum of 0.05% by weight of copper, a maximum of 0.002% by weight of phosphorus, a maximum of 0.002% by weight of calcium, a maximum of 0.002% by weight of sodium and/or a maximum of 0.30% by weight of iron in impurities is used.

4. The method of claim 1, wherein the aluminum alloy additionally contains a maximum of 0.2% by weight of vanadium, a maximum of 0.2% by weight of molybdenum and a maximum of 0.3% by weight of tin, a maximum of 0.3% by weight of cobalt and/or a maximum of 0.2% by weight of titanium.

5. The method of claim 1, wherein the single-stage solution annealing takes place at a temperature of at least 510° C. and at most 540° C., and wherein the time period over which the single-stage annealing takes place is at least 25 minutes.

6. The method of claim 1, wherein the quenching takes place with a temperature gradient of at least 20 K/s.

7. The method of claim 1, wherein the single-stage artificial aging takes place at a temperature of at least 135° C. to 230° C. over a period of at least 90 minutes and at most 420 minutes.

8. The method of claim 1, wherein the multi-stage artificial aging includes a first artificial aging and a second artificial aging, the first artificial aging taking place at a first temperature over a first period of time and the second artificial aging taking place at a second temperature over a second period of time, wherein the second temperature is higher than the first temperature and/or the second period of time is shorter than the first period of time.

9. A motor vehicle rim made of an aluminum alloy for a wheel of a motor vehicle wherein the motor vehicle rim has a rim base limited on opposite sides by an outer horn and an inner horn, a hub with a central recess and a hole circle, and a rim center connecting the rim base and the hub to one another, wherein the motor vehicle rim is produced in one piece and continuously in a casting mold by die casting of a casting material, the casting material being the aluminum alloy with constituents 6.5% by weight to 12.0% by weight of silicon, a maximum of 0.80% by weight of manganese, 0.25% by weight to 0.60% by weight of magnesium, 0.08% by weight to 0.50% by weight of zinc, a maximum of 0.30% by weight of zirconium, a maximum of 0.025% by weight of strontium, a maximum of 0.5% by weight of unavoidable impurities, and the remainder being aluminum, and the motor vehicle rim is heat-treated after the die casting, wherein the heat treatment includes a single-stage or multi-stage solution annealing, a subsequent quenching and a subsequent single-stage or multi-stage artificial ageing; wherein the single stage solution annealing takes place over a time period of at most 180 minutes.

10. The method of claim 2, wherein an aluminum alloy with a maximum of 0.05% by weight of copper, a maximum of 0.002% by weight of phosphorus, a maximum of 0.002% by weight of calcium, a maximum of 0.002% by weight of sodium and/or a maximum of 0.30% by weight of iron in impurities is used.

11. The method of claim 2, wherein the aluminum alloy additionally contains a maximum of 0.2% by weight of vanadium, a maximum of 0.2% by weight of molybdenum and a maximum of 0.3% by weight of tin, a maximum of 0.3% by weight of cobalt and/or a maximum of 0.2% by weight of titanium.

12. The method of claim 3, wherein the aluminum alloy additionally contains a maximum of 0.2% by weight of vanadium, a maximum of 0.2% by weight of molybdenum and a maximum of 0.3% by weight of tin, a maximum of 0.3% by weight of cobalt and/or a maximum of 0.2% by weight of titanium.

13. The method of claim 2, wherein the single-stage solution annealing takes place at a temperature of at least 510° C. and at most 540° C., and wherein the time period over which the single-stage annealing takes place is at least 25 minutes.

14. The method of claim 3, wherein the single-stage solution annealing takes place at a temperature of at least 510° C. and at most 540° C., and wherein the time period over which the single-stage annealing takes place is at least 25 minutes.

15. The method of claim 4, wherein the single-stage solution annealing takes place at a temperature of at least 510° C. and at most 540° C., and wherein the time period over which the single-stage annealing takes place is at least 25 minutes.

\* \* \* \* \*